Patented Nov. 2, 1948

2,452,602

UNITED STATES PATENT OFFICE 2,452,602

MANUFACTURE OF ALIPHATIC POLYAMINES

Correl N. Robinson, Jr., Trenton, and John F. Olin, Grosse Ile, Mich., assignors to Sharples Chemicals Inc., Philadelphia, Pa., a corporation of Delaware No Drawing. Application May 5, 1944, Serial No. 534,352

8 Claims. (Cl. 260—583)

The present invention pertains to the manufacture of aliphatic polyamines, and provides a process by which such compounds may be prepared from alpha, beta unsaturated aliphatic aldehydes and ketones. It involves a process which depends in part upon the fundamental reaction discovered by Mignonac and reported in "Comptes Rendus," volume 172, page 223.

In accordance with this general process, as developed by Mignonac and others, the aminating agent is mixed with an aldehyde or ketone in the presence of hydrogen, and the mixture is subjected to a temperature above the minimum reaction temperature at which the desired condensation reaction occurs, and below the temperature of decomposition of the desired amine. As practiced by Mignonac himself, the entire body of aldehyde or ketone was maintained in liquid phase, under the pressure of hydrogen, while being subjected to the amination reaction. Others, practicing a reaction which is similar to that of Mignonac in fundamental respects, have passed the aldehyde or ketone, together with hydrogen and an aminating agent, continuously in vapor phase through a heated reaction chamber to effect the desired reaction.

While Mignonac was primarily concerned with condensation of saturated carbon chain aldehydes and ketones with aminating agents and ammonia, this type of reaction has also been applied to manufacture of amines and aldehydes and ketones having unsaturated carbon chains (see British Patent 328,381, U. S. patent to Baur, 1,966,478, and French patent of addition 37,923 to original French Patent 628,641). In the process as modified by these patentees to include amination of unsaturated aldehydes and ketones, the purpose has been to effect hydrogenation at the carbon to carbon double bond simultaneously with amination, and thereby to produce a saturated monamine corresponding in carbon content to the aldehyde or ketone under treatment. This may be illustrated by the following equation:

1. 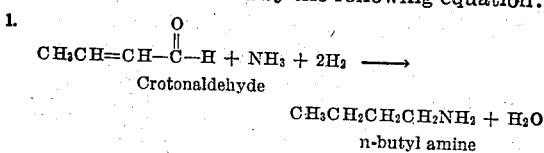
   n-butyl amine

The present invention involves a novel reaction, which is applied in condensation of alpha, beta unsaturated aliphatic aldehydes and ketones with hydrogen and an aminating agent chosen from the class consisting of ammonia and primary aliphatic amines. It rests upon the discovery that, by a novel modification of conditions in practice of this type of condensation reaction, an amino radical can be added to the molecule at the carbon to carbon double bond, instead of mere addition of hydrogen at this bond. Apparently, this double bond is activated by the condition of conjugation and other conditions of the reaction in such a manner as to cause addition of ammonia or an amine to be substituted in large part for the reaction of hydrogenation which was heretofore obtained. The reaction promoted by the practice of the present invention may be illustrated by the following equation:

2. 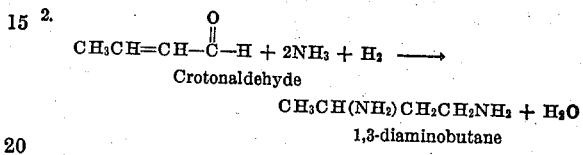
   1,3-diaminobutane

The novel feature of the present invention, by which the formation of the desired polyamine is favored in accordance with Equation 2 at the expense of formation of the saturated monamine as illustrated in Equation 1, involves maintenance of a body of the aminating agent under hydrogen pressure and progressive introduction of the alpha, beta unsaturated aldehyde or ketone into this body of aminating agent and hydrogen. By operating in this fashion, a very large excess of aminating agent is maintained under aminating and hydrogenating conditions at all tmes during the course of the reaction. In spite of the fact that hydrogen is constantly present, and hence available to effect hydrogenation at the double bond, the reaction between the aminating agent and hydrogen proceeds largely in accordance with Equation 2 when the unsaturated aldehyde or ketone is introduced progressively in accordance with the invention. In the preferred practice of the invention, the addition of the aldehyde or ketone to the reaction mixture is controlled at such a gradual rate as to maintain the rate of introduction substantially equal to the rate of reaction of the aldehyde or ketone being introduced. By conducting the reaction in this manner, the accumulation of any large quantity of aldehyde or ketone in the reaction mixture at any one time is avoided, and the desired polyamine is obtained in substantial yield and conversion. The catalysts used in the practice of the present invention are the same catalysts heretofore used in condensation of aminating agents and hydrogen with aldehydes and ketones, and any catalyst capable of promoting hydrogenation and dehydrogenation reactions may be employed, the preferred catalysts being hydrogenating metals, such as nickel, copper and cobalt.

The invention may be practiced in the presence or absence of a solvent for the reactants, although, like the original Mignonac process, it can be speeded up and otherwise improved by use of a suitable solvent such as methanol, aqueous methanol solutions, other primary or secondary alcohols or solutions thereof, glycerine, water or a hydrocarbon. In typical practice of the process of the invention, a solution of the ammonia or primary aliphatic amine may be placed, together with a hydrogenation catalyst, such as Raney nickel, in a hydrogenation autoclave fitted with a stirrer, vent-line and wellpipe. Hydrogen may then be introduced into the autoclave until the pressure rises to about 200–300 pounds per square inch. The stirrer is then started and heat applied until the desired temperature is reached, usually about 125–150° C., although temperatures substantially higher or lower than this range may be used successfully. After this condition is reached, the unsaturated aldehyde or ketone is pumped into the reaction vessel slowly. The aldehyde or ketone may or may not be dissolved in a solvent, and it may be introduced beneath the surface of the solution in the autoclave, or passed into the autoclove above the surface. Hydrogen is added to the autoclave from time to time, as the hydrogen originally supplied is used up in hydrogenation, and the pressure within the autoclave usually ranges between 600 and 1800 pounds per square inch. The temperature is kept fairly constant by regulation of the applied heat. After all of the aldehyde or ketone has been added, stirring and heat control are maintained until hydrogen absorption ceases. The time interval between the cessation of pumping and completion of hydrogen absorption depends upon the aldehyde or ketone undergoing ammonation-reduction, the amount of catalyst used, the quantity of ammonia or aminating agent present and the reaction temperature. This period is usually between 15 and 60 minutes. The constituents of the reaction mixture may be subjected to direct fractionation, or they may be acidified prior to distillation, the neutral substances thereafter distilled from the reaction mixture, and the residue then treated with a base in order to free the amines for subsequent distillation.

In the practice of the reaction as described above, it is ordinarily desirable that a large excess of ammonia or of the primary aliphatic amine serving as aminating agent be employed. The formation of the desired polyamines at the expense of saturated monamine which would otherwise be formed is always favored by the sequence of steps involving progressive addition of the aldehyde or ketone to the reaction mixture as discussed above, regardless of the ratio of aminating agent to aldehyde or ketone. Use of large molecular excesses of aminating agent, such as a 10:1 molar ratio, are, however, especially favorable to the desired reaction of this invention (Equation 2, above), and it is usually desirable that a ratio of at least 4:1 be used.

A large number of aliphatic diamines have been made by the practice of the present invention. Thus, 1,3-diamino butane has been made by ammonation-reduction of crotonaldehyde, 1,3-diamino-2-methyl propane has been made by similar treatment of alpha methyl acrolein, 1,3-diamino propane has been made from acrolein and ammonia, N,N'-diethyl-1,3-diamino butane has been made from crotonaldehyde and monoethyl amine, and 2,4-diamino-4-methyl-pentane has been prepared from mesityl oxide and ammonia. The invention is restricted to use of ammonia and primary amines as aminating agents, since secondary amines have not been successfully used in the practice of the invention by introduction of these amines at the carbon to carbon double bond.

While the invention may be applied in condensation reactions involving use of any aldehyde or ketone having an aliphatic linkage providing an olefinic double bond in conjugation with a carbon to oxygen double bond of the aldehyde or ketone, including even compounds containing aromatic or other radicals, it has been most successfully applied in condensation with ammonia and hydrogen of the simple aliphatic compounds having a maximum of six carbon atoms. The best aminating agents for use in practice of the invention are ammonia and alkyl amines containing from one to six carbon atoms, although amines of higher molecular weight (e. g., 7–10 carbon atoms) may be used. Temperatures between 75 and 175° C. are preferred for practice of the invention, although the condensation reaction of the invention can be accomplished at temperatures even as low as room temperature, and also at temperatures higher than 175° C., so long as the temperature is not so high as to cause destructive decomposition of the desired polyamine. In general, it is preferred that the temperature be maintained at least as high as 50° C. and not over 200° C. during the course of the reaction.

The following examples illustrate the practice of the invention:

*Example I*

80 grams of Raney nickel hydrogenation catalyst (9% of the weight of crotonaldehyde used), one liter of methanol and 612 grams (36 moles, a 3:1 ratio of ammonia to aldehyde) of anhydrous ammonia were placed in a stainless steel autoclave fitted with a Hill's McCanna proportioning pump. Hydrogen was introduced until the total pressure was between 200 and 300 pounds per square inch. The autoclave was heated to 73° C. during stirring of the contents, and 840 grams (12 moles) of crotonaldehyde dissolved in one liter of methanol were pumped in over a period of 94 minutes. Hydrogen was added as needed. The temperature was kept between 73 and 78° C. during the reaction, and the pressure varied between 600 and 900 pounds per square inch. Stirring and temperature control were maintained after addition of the aldehyde had been completed until hydrogen absorption ended. The crude reaction mixture was subjected to fractional distillation. 287 grams of 1,3-diamino butane and 234 grams of monobutyl amine were obtained, together with a very small amount of butanol and 200 grams of higher boiling materials.

*Example II*

1 liter of methanol, 25 grams (3%) of Raney nickel catalyst and 612 grams (36 moles, a 3:1 ratio of ammonia to aldehyde) of anhydrous ammonia were placed in a stainless steel autoclave. Hydrogen was added until the total pressure was between 200 and 300 pounds per square inch. The mixture was heated to a temperature of 175° C. and 840 grams (12 moles) of crotonaldehyde dissolved in one liter of methanol were gradually pumped in over a period of 34 minutes. The temperature averaged 175° C. during the run, and the pressure varied between 800 and 1400 pounds per square inch. Hydrogen was added from time to time and the mixture was heated and stirred for about 15 minutes after all the aldehyde had been added. Hydrogen absorption was then complete. Upon distillation, 219 grams of 1,3-diamino butane, 462 grams of monobutyl amine and 16 grams of dibutyl amine were obtained, as well as 75 grams of higher boiling materials.

Example III 60 grams of Raney nickel (7%), 1 liter of methanol and 2040 grams (120 moles) of anhydrous ammonia were placed in a stainless steel autoclave. Hydrogen was introduced until the pressure rose to 300 pounds per square inch. The autoclave was heated to 155° C., with stirring, and 12 moles (840 grams) of crotonaldehyde dissolved in one liter of methanol were gradually pumped in over a period of 57 minutes. Hydrogen was added as needed and the pressure varied between 1000 and 1600 pounds per square inch during the reaction. Hydrogen absorption was complete about 15 minutes after all of the aldehyde had been added. Upon distillation, there were obtained 406 grams of 1,3-diamino butane, 270 grams of monobutyl amine and 9 grams of dibutyl amine, in addition to 130 grams of higher boiling materials.

Example IV

This example was conducted in a manner substantially identical with that of Example III, except that, instead of using methanol only as a solvent, a solution of 25% of water in 75% of methyl alcohol (by volume) was used. 522 grams of 1,3-diamino butane, 262 grams of monobutyl amine, 18 grams of dibutyl amine and 80 grams of higher boiling materials were obtained.

Example V 2 liters of the solvent of Example IV, 60 grams of Raney nickel and 2040 grams of anhydrous ammonia were placed in an autoclave. Hydrogen was introduced until the pressure reached 300 pounds per square inch and the autoclave was heated with stirring to 125° C. 840 grams of crotonaldehyde (no solvent) were pumped in over a period of 57 minutes, hydrogen being added from time to time. The pressure varied between 700 and 1200 pounds per square inch. 572 grams of 1,3-diamino butane, 120 grams of monobutyl amine, 23 grams of dibutyl amine and 120 grams of higher boiling materials were obtained.

Example VI 60 grams of Raney nickel, 1 liter of the solvent of Example IV and 2040 grams of anhydrous ammonia were placed in an autoclave. A small quantity of hydrogen was introduced and the autoclave was heated with stirring to 125° C. 840 grams of redistilled crotonaldehyde dissolved in one liter of the solvent were gradually pumped in over a period of 56 minutes, hydrogen being added as needed, and the temperature maintained as in previous examples. 657 grams of 1,3-diamino butane, 155 grams of monobutyl amine, and 10 grams of dibutyl amine were obtained.

Example VII 30 grams of Raney nickel, one liter of the solvent of Example IV and 1330 grams of anhydrous ammonia were placed in an autoclave. Hydrogen was added and the autoclave heated to 125° C. 364 grams of acrolein dissolved in one liter of the solvent were pumped in slowly over a period of 55 minutes, hydrogen being added and the temperatures maintained as in previous examples, and the pressure varying between 800 and 1200 pounds per square inch. 163 grams of 1,3-diamino propane were obtained, as well as 88 grams of mono-propyl amine, 12 grams of dipropyl amine and 110 grams of residue consisting of a nearly solid material.

Example VIII 60 grams of Raney nickel, 1 liter of the solvent of Example IV and 1350 grams of anhydrous ammonia were placed in an autoclave. Hydrogen was added until the pressure rose to 300 pounds per square inch, and heat and stirring were applied. After a temperature of 125° C. was reached, 336 grams of alpha methyl acrolein dissolved in one liter of the solvent were pumped into the autoclave over a period of 25 minutes. Hydrogen was added and the temperature maintained as in previous examples, the pressure varying between 800 and 1350 pounds per square inch. 84 grams of 1,3-diamino-2-methyl propane were obtained, together with 183 grams of mono-isobutyl amine, 22 grams of di-isobutyl amine and 80 grams of nearly solid residue.

Example IX

½ liter of the solvent of Example IV, 60 grams of Raney nickel and 2025 grams of mono-ethyl amine were placed in an autoclave. Hydrogen was added and the autoclave was heated as before until the pressure became 900 pounds per square inch and the temperature 125° C. 630 grams of crotonaldehyde dissolved in 750 cc. of the solvent were then introduced over a period of 52 minutes, with maintenance of temperature and addition of further hydrogen as in previous examples, the pressure varying between 550 and 1100 pounds per square inch. 286 grams of 1,3-bis-ethyl amino butane (boiling point 180–1° C., specific gravity at 20° C.—0.814) were obtained, together with 490 grams of N-ethyl-n-butyl amine, and a residue of 35 grams.

Example X 1 liter of methanol, 60 grams of Raney nickel, and 1530 grams of anhydrous ammonia were placed in an autoclave. Hydrogen was added until the pressure rose to 300 pounds per square inch, and the autoclave was heated to 150° C. 882 grams of mesityl oxide dissolved in one liter of methanol were gradually pumped in over a period of 60 minutes. Hydrogen was added as needed and the reaction temperature maintained as in preceding examples, the pressure varying between 1000 and 1500 pounds per square inch. A substantial quantity of 2,4-diamino-4-methyl pentane (boiling point 152–4° C., specific gravity at 20° C., 0.828) was obtained From the above examples, it will be seen that the ratio of aliphatic diamine to other resultants of the reaction varies considerably, depending upon the conditions of the reaction. In general, it may be said that the ratio of diamine to saturated mono- and poly-alkyl monamines is increased by reducing the temperature of the reaction, and choice of best conditions for practice of the invention involves striking a proper balance between this relationship and the maintenance of conditions to obtain reasonably rapid conversion of the reactants to the desired products. The ratios of the various resultants to each other will also vary with the particular aldehyde or ketone under treatment and the particular aminating agent, as well as with the hydrogenation catalyst used, and it is impossible to develop any adequate generalizations in connection with these last-mentioned factors. It is believed, however, that the above specific examples will serve as an adequate guide to those skilled in the art in choice of particular conditions suitable for practice of the invention.

Various modifications are possible within the scope of the invention, and we do not therefore wish to be limited except by the scope of the following claims.

We claim:

1. In the manufacture of amines by condensing a carbonyl compound having an unsaturated linkage with an aminating agent and hydrogen, the process of forming an aliphatic polyamine which comprises introducing a compound chosen from the class consisting of alpha, beta, ethylenic unsaturated aliphatic aldehydes and ketones progressively into a reaction vessel containing hydrogen under pressure, a hydrogenation catalyst, and an aminating agent chosen from the class consisting of ammonia and primary aliphatic amines, the alpha, beta unsaturated carbonyl compound being introduced into the reaction vessel containing the aminating agent at a rate not substantially greater than the rate of reaction thereof with the aminating agent.

2. In the manufacture of amines by condensing a carbonyl compound having an unsaturated linkage with an aminating agent and hydrogen, the process of forming an aliphatic polyamine which comprises introducing a carbonyl compound chosen from the class consisting of alpha, beta, ethylenic unsaturated aliphatic aldehydes and ketones progressively into a reaction vessel containing hydrogen under pressure, a hydrogenation catalyst, and an aminating agent chosen from the class consisting of ammonia and primary aliphatic amines, said aminating agent being maintained in liquid phase during introduction of said carbonyl compound, the alpha, beta unsaturated carbonyl compound being introduced into the reaction vessel containing the aminating agent at a rate not substantially greater than the rate of reaction thereof with the aminating agent.

3. In the manufacture of amines by condensing a carbonyl compound having an unsaturated linkage with an aminating agent and hydrogen, the process of forming an aliphatic polyamine which comprises introducing a carbonyl compound chosen from the class consisting of alpha, beta, ethylic unsaturated aliphatic aldehydes and ketones progressively into a reaction vessel containing hydrogen under pressure, a hydrogenation catalyst, and ammonia, at a rate not substantially greater than the rate of reaction of said carbonyl compound with ammonia, the ammonia being maintained in liquid phase during introduction of said carbonyl compound.

4. In the manufacture of amines by condensing a carbonyl compound having an unsaturated linkage with an aminating agent and hydrogen, the process of forming an aliphatic polyamine which comprises introducing an alpha, beta ethylenic unsaturated aldehyde progressively into a reaction vessel containing hydrogen under pressure, a hydrogenation catalyst, and a large molecular excess of an aminating agent chosen from the class consisting of ammonia and primary aliphatic amines, said aminating agent being maintained in liquid phase at a temperature between 50 and 200° C. during introduction of said aldehyde.

5. In the formation of aliphatic diamines by the catalytic reaction of hydrogen and an aliphatic carbonyl compound chosen from the class consisting of aliphatic aldehydes and ketones containing an ethylenic linkage between carbon atoms which are alpha and beta to the carbonyl group with an aminating agent chosen from the class consisting of ammonia and primary aliphatic amines, the process comprising introducing a body of the aminating agent into the reaction vessel and maintaining that body of aminating agent under hydrogen pressure in liquid phase in the presence of a hydrogenating catalyst maintained in said reaction vessel and introducing the carbonyl compound progressively into said body of aminating agent at a rate not substantially greater than the rate of reaction of said carbonyl compound with said aminating agent, while said body of aminating agent is maintained in liquid phase under hydrogen pressure at a temperature between 50 and 200° C.

6. In the manufacture of aliphatic diamines the process which comprises reacting in the liquid phase an aminating agent chosen from the class consisting of ammonia and primary aliphatic amines with an aliphatic carbonyl compound containing an ethylenic linkage between the carbon atoms alpha and beta to the carbonyl group in the presence of hydrogen and a hydrogenating catalyst in such a manner that at any instant there obtains a substantial molecular excess of aminating agent to carbonyl compound.

7. In the manufacture of aliphatic diamines the process which comprises reacting an aminating agent chosen from the class consisting of ammonia and primary aliphatic amines with an aliphatic aldehyde having a maximum of six carbon atoms and an ethylenic linkage between the carbon atoms alpha and beta to the carbonyl group in the presence of hydrogen and a hydrogenating catalyst, the aldehyde being introduced progressively into a reaction vessel containing the aminating agent and hydrogen under pressure at a rate not substantially greater than the rate of reaction of said aldehyde with said aminating agent.

8. In the manufacture of aliphatic diamines the process which comprises reacting an aminating agent chosen from the class consisting of ammonia and primary aliphatic amines with an aliphatic ketone having a maximum of six carbon atoms and an ethylenic linkage between the carbon atoms alpha and beta to the carbonyl group in the presence of hydrogen and a hydrogenating catalyst, the ketone being introduced progressively into a reaction vessel containing the aminating agent and hydrogen under pressure at a rate not substantially greater than the rate of reaction of said ketone with said aminating agent.

CORREL N. ROBINSON, Jr.
JOHN F. OLIN.

REFERENCES CITED

The following references are of record in the file of this patent:

UNITED STATES PATENTS

| Number | Name | Date |
|---|---|---|
| 1,966,478 | Baur | July 17, 1934 |
| 1,972,450 | Klavehn | Sept. 4, 1934 |
| 2,045,574 | Adkins | June 30, 1936 |

OTHER REFERENCES

Chemical Abstracts, vol. 31 (1937), page 2216.